UNITED STATES PATENT OFFICE.

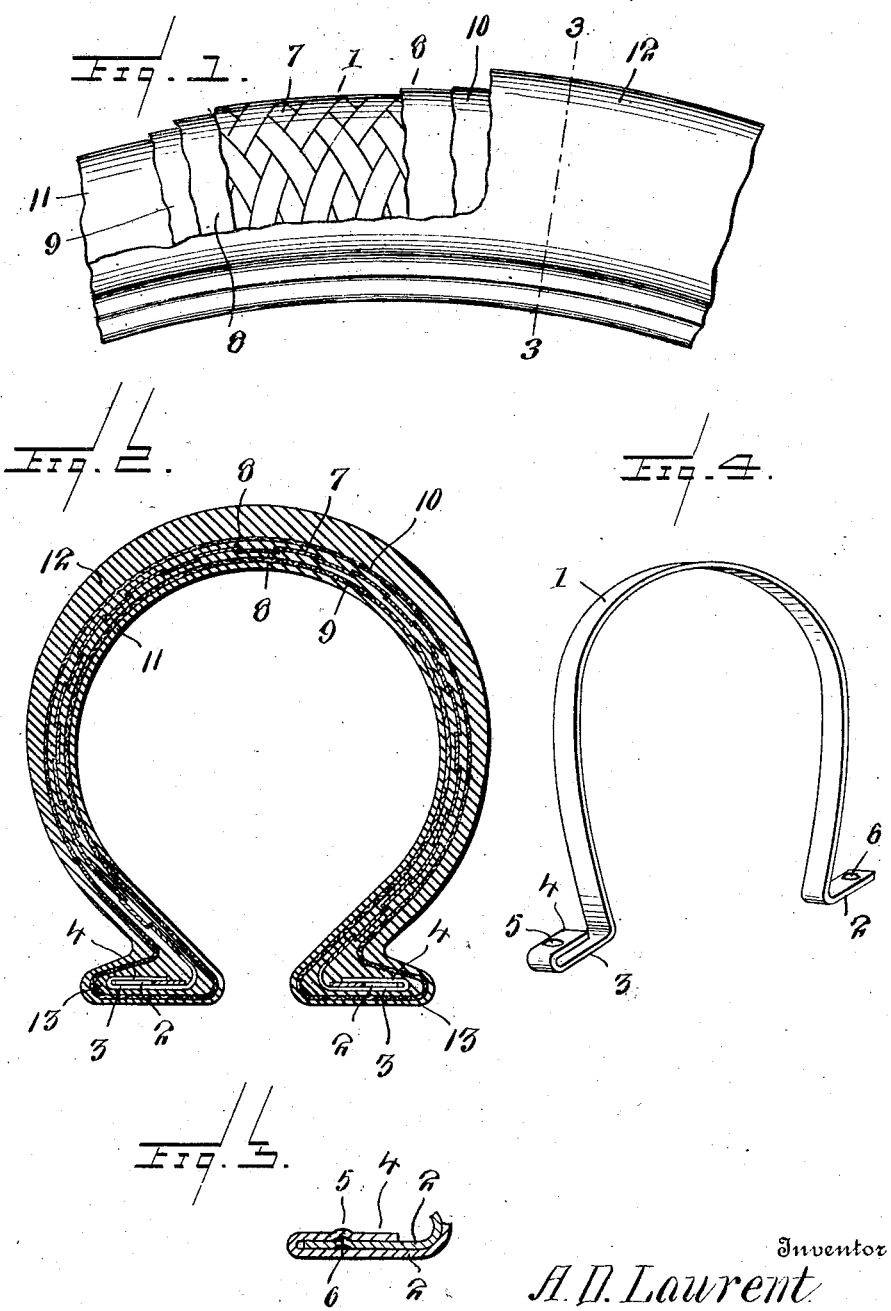

AUGUSTUS D. LAURENT, OF WESTFIELD, NEW JERSEY.

TIRE.

1,109,427.  Specification of Letters Patent.  Patented Sept. 1, 1914.

Application filed February 24, 1912. Serial No. 679,615.

*To all whom it may concern:*

Be it known that I, AUGUSTUS D. LAURENT, a citizen of the United States, residing at Westfield, in the county of Union and State of New Jersey, have invented new and useful Improvements in Tires, of which the following is a specification.

My invention relates to improvements in tires for automobiles or such vehicles, and in particular to the outer, protective casing of such tires.

An object of the invention is the provision of protective armor embedded in the outer casing which is so constructed that it will tend to prevent puncture of the inner tire and at the same time give the desired resiliency and cushioning effect.

A further object of the invention is the provision of protective armor for the outer casing whose elements may be readily assembled in the manufacture thereof, and which will effectively reinforce the tire flanges at their points of engagement with the wheel rim.

Further objects of the invention will appear as the following specific description is read in connection with the accompanying drawing which forms a part of this application, and in which:

Figure 1 is a broken view of the device; Fig. 2 is a transverse sectional view taken on the line 3—3 of Fig. 1; Fig. 3 is a transverse sectional view of the spring elements, showing the construction of the joints; and Fig. 4 is a perspective view of one of the spring elements.

Referring now to the drawings, the numeral 1 designates one of the bowed, spring, steel elements, one of whose extremities is bent outwardly as at 2. The opposite extremity of the element 1 is bent outwardly as at 3 and then bent back to form an overlying, locking portion 4, whose under surface is provided with a pocket 5. The outbent extremity 2 is provided on its upper surface with an outstruck portion 6. Each of the spring elements 1 are similarly constructed, but have their extremities alternately transposed so that the extremities 2 are removably locked with the extremities 3, the pockets 5 in the overlying portions 4 removably receiving the outstruck portions 6. It might be further stated that the pockets 5 are depressed, whereby when the outstruck portions 6 are sprung into the latter a permanent interlocking connection will be established between the steel elements. The main portions of the elements 1 are interwoven to form a protective mesh 7 which is embedded in a layer of elastic material, preferably rubber, designated by the numeral 8. The rubber layer 8 is lined within and without with heavy canvas or other fabric, as at 9 and 10, respectively. Inner and outer layers 11 and 12, respectively, of rubber or similar elastic composition are applied to the inner and outer surfaces of the canvas linings 9 and 10.

It will be seen that I have provided spring elements detachable at the joints, thus facilitating the assembling of the elements, and whose joints further serve as reinforcing means for the flanges 13 of the casing at the points where they are engaged by the rim. These springs will also sustain the load in case the tire is punctured.

Having thus described my invention, I claim:

1. In a vehicle tire, a body consisting of woven elements of resilient material of U-configuration, one extremity of each element being turned outwardly and bent to form an overlying engaging portion, said portion being provided with an internal socket, the opposite end of each element being bent outwardly and forming a straight portion to be inserted within the engaging portion of the meeting end of a companion element, and a projection provided upon the straight portion of each element for engagement with the socket of the engaging portion of the element associated therewith.

2. In a vehicle tire, a body consisting of woven elements of resilient material of U-configuration, one extremity of each element being extended outwardly and thence bent inwardly to form an overlying engaging portion, said portion being disposed in superposed relation to the outwardly extending portion throughout its entire length, said engaging portion being provided in its opposed surface with a depressed socket, the opposite end of each element being bent outwardly and forming a straight portion adapted to be sprung within the engaging portion of the meeting end of a companion element, and a projection provided upon the straight portion of each element, adjacent its terminal portion for engagement with the depressed socket of the engaging portion of the element associated therewith.

In testimony whereof I affix my signature in presence of two witnesses.

AUGUSTUS D. LAURENT.

Witnesses:
 EMANUEL ECKEL,
 CHAS. E. COX.

Copies of this patent may be obtained for five cents each, by addressing the "Commissioner of Patents, Washington, D. C."